(12) United States Patent
Kawakami

(10) Patent No.: US 12,168,366 B2
(45) Date of Patent: Dec. 17, 2024

(54) WHEEL RIM WITH HEAT DISSIPATING FINS

(71) Applicant: BRIDGESTONE CORPORATION, Tokyo (JP)

(72) Inventor: Yuki Kawakami, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 446 days.

(21) Appl. No.: 17/601,597

(22) PCT Filed: Jun. 17, 2020

(86) PCT No.: PCT/JP2020/023681
§ 371 (c)(1),
(2) Date: Oct. 5, 2021

(87) PCT Pub. No.: WO2020/255987
PCT Pub. Date: Dec. 24, 2020

(65) Prior Publication Data
US 2022/0169074 A1    Jun. 2, 2022

(30) Foreign Application Priority Data
Jun. 17, 2019   (JP) .................................. 2019-112189

(51) Int. Cl.
*B60B 19/10* (2006.01)
*B60B 21/10* (2006.01)
*B60B 25/10* (2006.01)

(52) U.S. Cl.
CPC ............ *B60B 19/10* (2013.01); *B60B 21/104* (2013.01); *B60B 25/10* (2013.01); *B60B 2900/513* (2013.01)

(58) Field of Classification Search
CPC ..................................................... B60B 19/10
See application file for complete search history.

(56) References Cited

U.S. PATENT DOCUMENTS

| 10,821,776 B1* | 11/2020 | Labadie .................. B60B 19/10 |
| 2011/0057504 A1 | 3/2011 | Nagata et al. |
| 2011/0233992 A1 | 9/2011 | Hino |
| 2012/0056467 A1 | 3/2012 | Hino |
| 2014/0191565 A1 | 7/2014 | Gebeau |

FOREIGN PATENT DOCUMENTS

| CN | 102009566 A | 4/2011 |
| CN | 102224020 A | 10/2011 |
| CN | 102448738 A | 5/2012 |

(Continued)

OTHER PUBLICATIONS

Extended European Search Report dated Jun. 21, 2023 in Application No. 20826097.6.

(Continued)

*Primary Examiner* — Jason R Bellinger
(74) *Attorney, Agent, or Firm* — Sughrue Mion, PLLC

(57) ABSTRACT

A vehicle wheel having a rim part to which a tire is mounted and a vehicle body attachment part which is attached to a vehicle body, in which the rim part has, on an inner circumferential surface thereof, a plurality of fins each having a heat dissipation surface, and in which the fins are arranged periodically along a circumferential direction.

8 Claims, 16 Drawing Sheets

(56) References Cited

FOREIGN PATENT DOCUMENTS

| | | |
|---|---|---|
| CN | 208180662 U | 12/2018 |
| JP | 60-25802 A | 2/1985 |
| JP | 2004-196005 A | 7/2004 |
| JP | 2010-006135 A | 1/2010 |
| JP | 2011-093360 A | 5/2011 |
| JP | 5559700 B2 | 7/2014 |
| KR | 10-2005-0035328 A | 4/2005 |

OTHER PUBLICATIONS

Written Opinion of the International Searching Authority issued Aug. 25, 2020 in International Application No. PCT/JP2020/023681.
International Search Report for PCT/JP2020/023681 dated Aug. 25, 2020 [PCT/ISA/210].
Written Opinion for PCT/JP2020/023681 dated Aug. 25, 2020 [PCT/ISA/237].
Chinese Search Report dated Jan. 30, 2024 in Chinese Application No. 202080040864X.

* cited by examiner

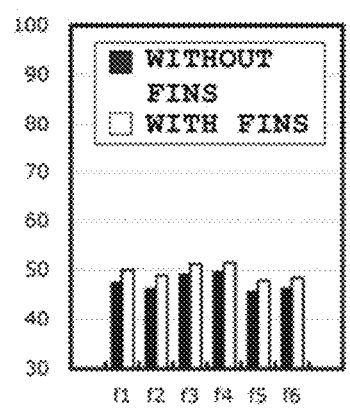
FIG. 6A
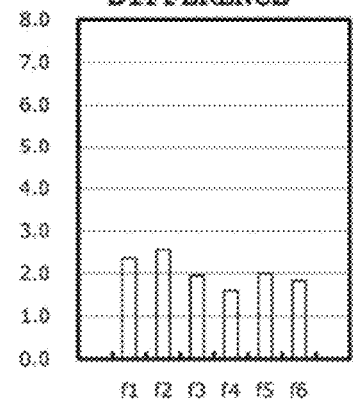
FIG. 6B TEMPERATURE DIFFERENCE
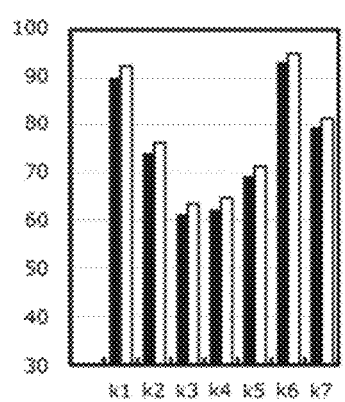
FIG. 7A
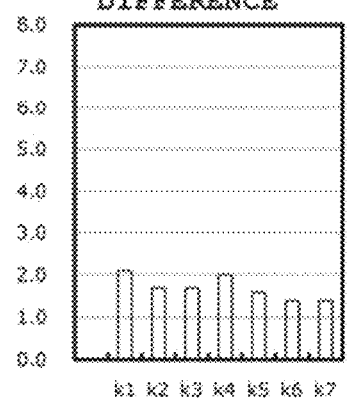
FIG. 7B TEMPERATURE DIFFERENCE

FIG. 8B TEMPERATURE DIFFERENCE

FIG. 9B TEMPERATURE DIFFERENCE

WHEEL RIM WITH HEAT DISSIPATING FINS

CROSS REFERENCE TO RELATED APPLICATIONS

This application is a National Stage of International Application No. PCT/JP2020/023681 filed Jun. 17, 2020, claiming priority based on Japanese Patent Application No. 2019-112189 filed Jun. 17, 2019.

TECHNICAL FIELD

The present invention relates to vehicle wheels and tire-wheel assemblies, and more particularly to a vehicle wheel and a tire-wheel assembly which are capable of efficiently dissipating heat generated by tires during driving.

BACKGROUND

Conventionally, there has been known that tires generate heat, which accelerates deterioration of rubbers and affects durability of the tires. The heat generation of a tire mainly occurs in a tread part and a bead part of the tire. The heat occurred in these parts is transmitted through the rubber that forms the tire and dissipated to the open air from an outer surface of the tire or from a rim through the air inside the tire. For example, Patent Document 1 discloses a technology for efficiently dissipating the heat generated in the tire so as to suppress a temperature rise in the tire. In Patent Document 1, plural convexes with a height of about 0.5 mm to 5 mm are randomly arranged on the inner circumferential surface of the rim in the circumferential direction of the tire, and turbulent flow is caused, by the randomly arranged convexes, on the inner circumferential surface of the rim, thereby improving the heat dissipation efficiency from the rim and suppressing the temperature rise in the tire.

CITATION DOCUMENT

Patent Document

Patent Document 1: Japanese Patent No. 5559700

SUMMARY OF THE INVENTION

Technical Problem

However, in the technology disclosed in Patent Document 1 has a limitation to the heat dissipation effect. For example, when a large load is continuously applied to the tire, such as in the case of trucks, buses, or construction vehicles (heavy duty vehicles), there has been a problem that sufficient heat dissipation effect cannot be attained. As a result of simulating the air flow around the tires of a running vehicle, the inventor has found that the translational airflow caused by the running vehicle changes, after hitting the tire, its direction and flows into the rim. In other words, the translational airflow flows into the rim regardless of whether or not the rim is provided with fins. Accordingly, it can be said that heat transfer from the rim to the fins is high within the rim even when there are no fins. For this reason, there is a limitation to the heat dissipation effect obtained by causing the turbulent flow by the fins as in Patent Document 1.

The present invention aims at providing a vehicle wheel and a tire-wheel assembly which are capable of improving the heat dissipation effect and suppressing the temperature rise regardless of conditions of use of the tire.

Solution to Problem

As an aspect of a vehicle wheel for solving the above-mentioned problem, the vehicle wheel includes a rim part on which a tire is mounted and a vehicle body attachment part which is attached to a vehicle body, in which the rim part has, on an inner circumferential surface thereof, a plurality of fins each having a heat dissipation surface, and in which the fins are arranged periodically along a circumferential direction.

BRIEF DESCRIPTION OF THE DRAWINGS

FIGS. 6A and 6B are diagrams illustrating experimental results;
FIGS. 7A and 7B are diagrams illustrating experimental results;
FIGS. 8A and 8B are diagrams illustrating experimental results;
FIGS. 9A to 9C are diagrams illustrating experimental results.

DESCRIPTION OF EMBODIMENTS

The present invention will be described in detail below through embodiments of the invention; however, the following embodiments are not intended to limit the inventions set forth in the claims, and all of combinations of the features described in the embodiments are not necessarily essential to the solving means of the invention, and includes configurations which are selectively adopted.

Figure 1:
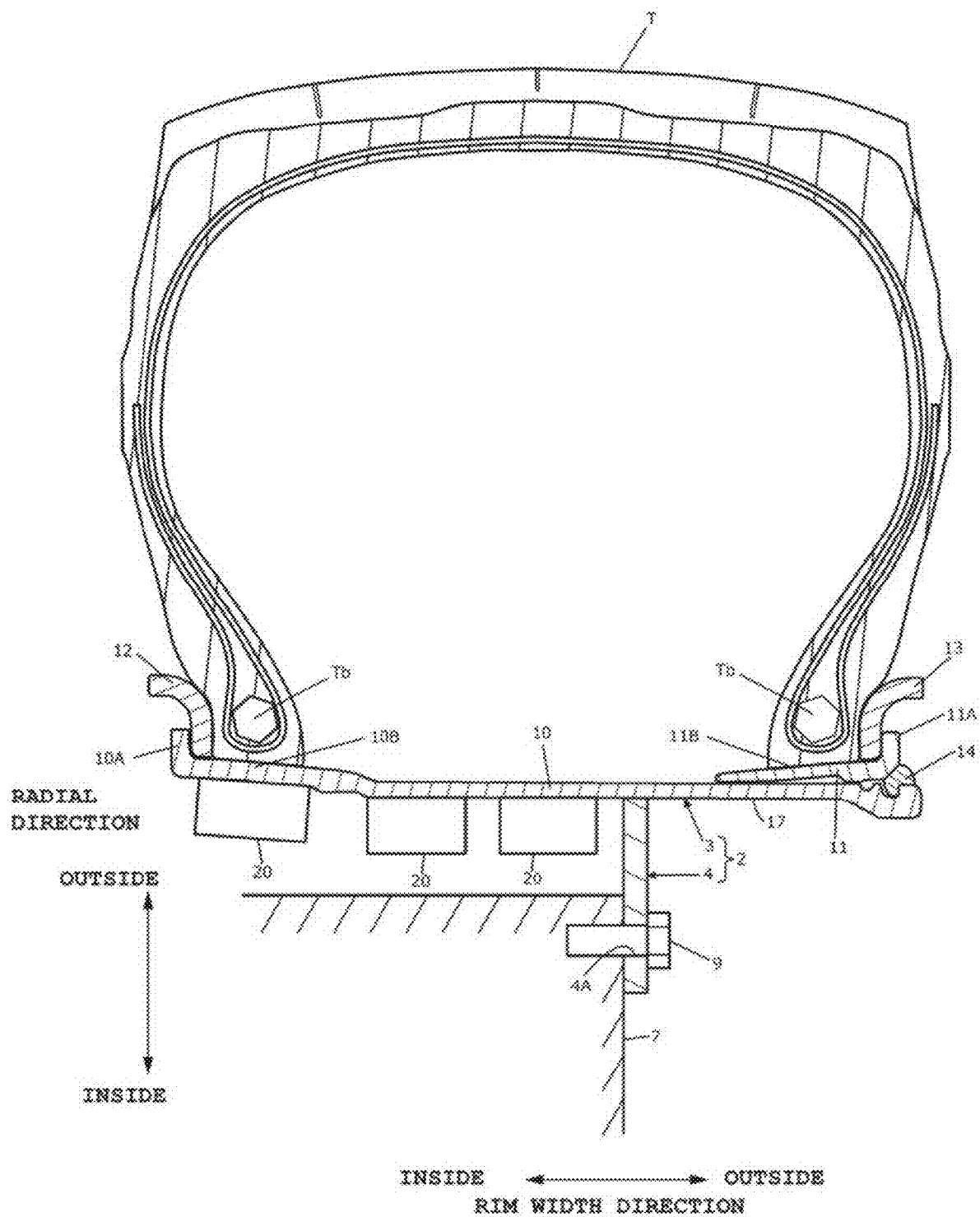
FIG. 1 is a cross-sectional view of a tire-wheel assembly.
Figure 2:
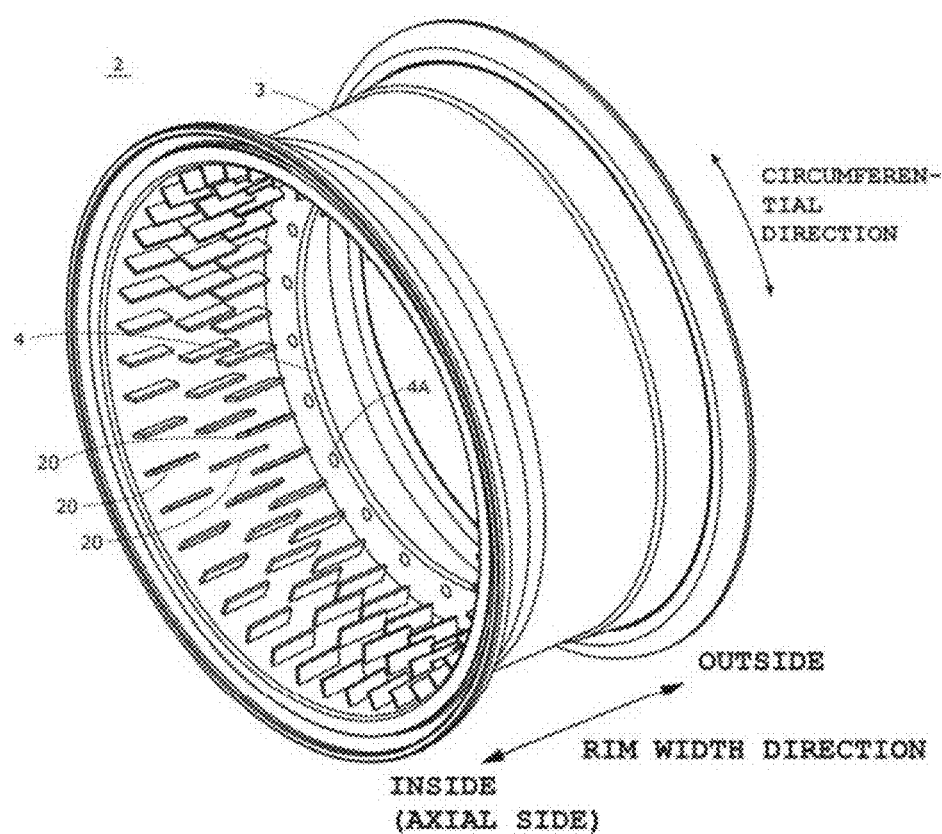
FIG. 2 is a perspective view illustrating an inner circumferential surface side of a wheel.

FIG. 1 is a cross-sectional view of a tire-wheel assembly in which a tire T is assembled on a vehicle wheel according to an embodiment of the present invention. FIG. 2 is a perspective view illustrating an inner circumferential surface of the wheel. As illustrated in FIG. 1, a vehicle wheel (hereinafter simply referred to as the wheel) 2 has a rim part (hereinafter simply referred to as the rim) 3 on which a tire T is fixed, and an axle attachment part 4 which is fixed to an axle member 7 of a vehicle. The wheel 2 is formed, for example, from a metal such as steel or aluminum alloy, or from a non-metal material and the like. In the present embodiment, explanations will be given that the material of the wheel 2 is being steel.

As illustrated in FIG. 1, the rim 3 is a so-called split rim configured roughly of a rim base 10, a bead seat ring 11, a pair of side rings 12; 13, and a lock ring 14, and is used for heavy duty vehicles such as very large dump trucks. The rim base 10 is a roughly cylindrical cylinder body which is capable of penetrating into an inner circumference side of the tire T, and which has a flange part 10A expanding in diameter outwardly in a radial direction, on an outer circumference at one end side in an axial direction. The flange part 10A is formed so as to have a diameter larger by a predetermined dimension than an inner diameter of the tire T, and is provided so as to be able to engage one side ring 12.

A bead seat part 10B, to which an inner circumference of a bead part Tb of the tire T can adhere, is formed on the outer circumference part which is part the flange part 10A of the rim base 10. The bead seat ring 11 is provided on the outer circumference at the other end side in the axial direction of the rim base 10 on which the flange part 10A is formed. The bead seat ring 11 is mainly formed of a ring body having a wedge-shaped cross-section in a rim width direction, and is formed so as to be able to be inserted between the outer circumference of the rim base 10 and the inner circumference of the bead part Tb of the tire T.

A flange part 11A that expands in diameter outwardly in the radial direction is provided on an outer circumference at a thick-walled side of the bead seat ring 11. The flange part 11A is formed so as to have a diameter larger by a predetermined dimension than the inner diameter of the tire T, and is provided so as to be able to engage the other side ring 13. Further, a bead seat part 11B, to which the inner circumference of the bead part Tb of the tire T can adhere, is formed on the outer circumference part which is adjacent to the flange part 11A of the bead seat ring 11. The side rings 12; 13 are formed in a ring shape of a size so as to be able to be engaged by the flange part 10A of the rim base 10 and the flange part 11A of the bead seat ring 11, and are formed so that, in a state of being engaged by the flange part 10A of the rim base 10 and the flange part 11A of the bead seat ring 11, side surfaces thereof in the rim width direction can adhere to side surfaces of the bead parts Tb; Tb.

The lock ring 14 is an annular member that is to be inserted between the outer circumference of the rim base 10 and the inner circumference of the bead seat ring 11 when the bead seat ring 11 is inserted between the rim base 10 and the inner circumference of the tire T. The lock ring 14 secures the bead seat ring 11 to the rim base 10 when inserted between the outer circumference of the rim base 10 and the inner circumference of the bead seat ring 11.

In a state where the tire T is placed between the side rings 12; 13, by applying internal pressure to the tire T via a valve, which is not shown in the figure, provided in the rim base 10, one of the bead parts Tb adheres to the bead seat part 10B of the rim base 10 and to the side ring 12, and the other one of the bead parts Tb adheres to the bead seat part 11B of the bead seat ring 11 and the side ring 13, to thereby secure the tire T to the rim 3. As a result, a sealed space is formed between the tire T and the rim 3.

Further, the rim base 10 has the axle attachment part 4 and plural fins 20 on its inner circumference side. As illustrated in FIG. 2, the axle attachment part 4 is formed in a flat circular ring shape extending over one round of the inner circumferential surface 17 of the rim base 10 along the rim circumferential direction. The axle attachment part 4 is integrated into the rim base 10 by fixing the outer circumference side of the axle attachment part 4 to the inner circumference of the rim base 10 by a fixing means such as welding. The axle attachment part 4 has plural through holes 4A that penetrate in a thickness direction and that are provided at even intervals along the rim circumferential direction. As illustrated in FIG. 1, the wheel 2 is fixed to the vehicle in a state of being integrated with the tire T by inserting bolts 9 into the through holes 4A provided in the axle attachment part 4 and fastening them to threaded holes, which are not shown in the figure, provided on the axle member 7 of the vehicle.

Figure 3:
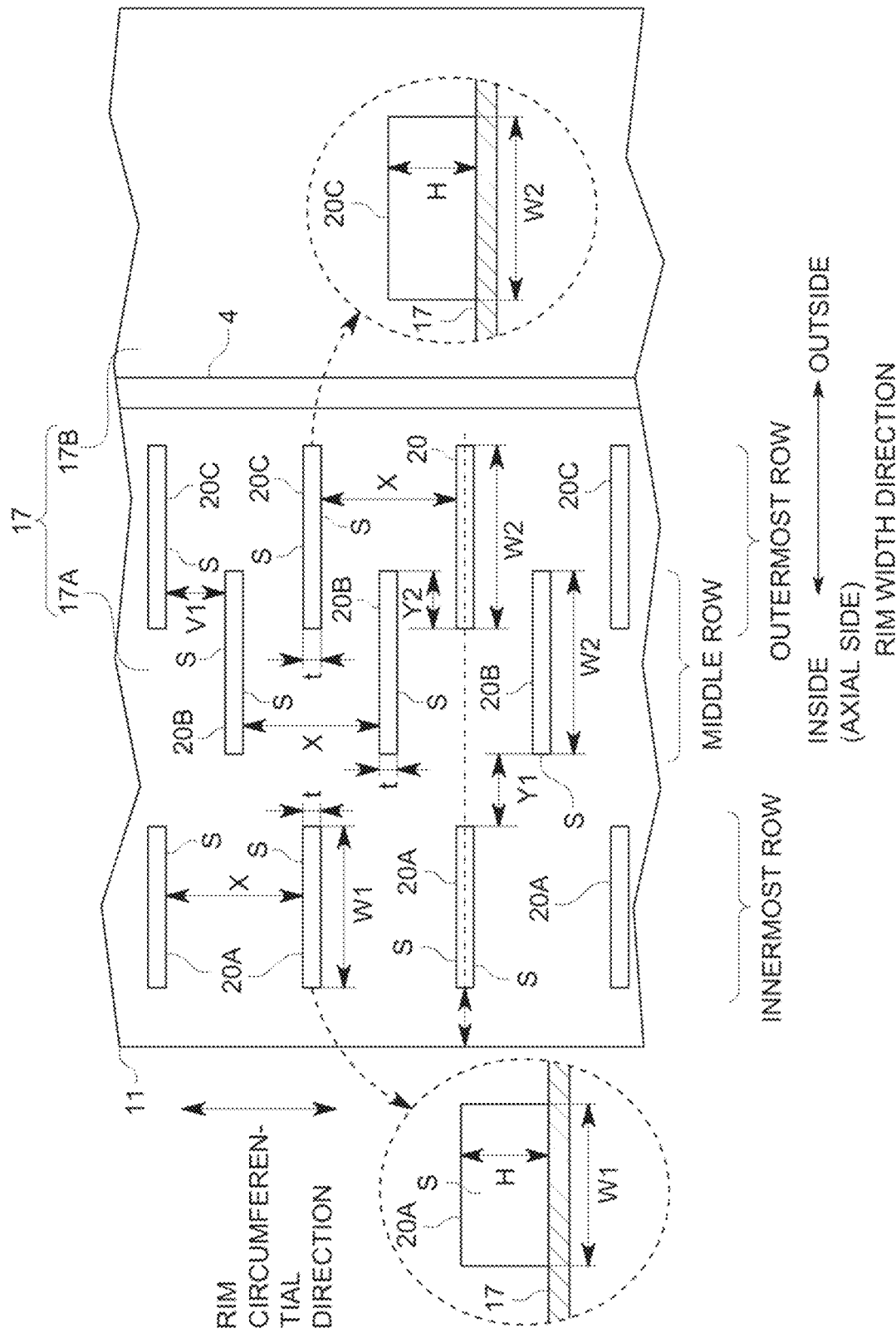
FIG. 3 is a a planar development view of the inner circumference surface.

FIG. 3 is a planar development view of the inner circumference surface of the rim base. As illustrated in FIGS. 2 and 3, the fin 20 is provided in plural numbers on the inner circumference side of the rim base 10.

In the present embodiment, of the inner peripheral surface (hereinafter referred to as the rim inner peripheral surface) 17 of the rim 3, a region closer to the axle side than the axle attachment part 4 was set as an installation region of the fins 20. Hereinafter, this region is referred to as an inside inner peripheral surface 17A, and a region outward of the axle attachment part 4 is referred to as an outside inner peripheral surface 17B.

The fins 20 according to the present embodiment are provided to protrude from the inside inner peripheral surface 17A of the rim base 10 at even intervals along the rim circumferential direction. That is, the fins 20 are provided periodically along the rim circumferential direction. By arranging the fins 20 in this manner, a rotational balance can be made suitable when the wheel 2 is rotated.

As illustrated in FIG. 3, the fins 20 are arranged in three rows in a rim width direction on the inside inner peripheral surface 17A. Hereinafter, with respect to the fins 20 arranged in rows in the rim circumferential direction, fins 20 located at the innermost side in the rim width direction are called innermost row fins 20A (fins 20A), fins 20 located in the middle are called middle row fins 20B (fins 20B), and fins 20 located at the outermost side are called outermost row fins 20C (fins 20C).

As illustrated in FIG. 2, each of the fins 20A to 20C is, for example, made of a flat plate with a constant thickness and formed to have a heat dissipation surface S with predetermined dimensions. In the present embodiment, the thickness t of the fins 20A to 20C is set to be the same, and the shape of the heat dissipation surface S is set to be rectangular. The heat dissipation surface S is provided on both sides of each of the fins 20A to 20C. The fins 20A to 20C are provided so as to extend in a rotational center direction of the rim 3, that is, in a normal direction of the inside inner peripheral surface 17A. The size of each of the fins 20A to 20C is set so that the heat dissipation surface S has a predetermined area. In the present embodiment, the heat dissipation surface S refers to, for convenience of explanation, a wall surface rising from the inside inner peripheral surface 17A, excluding so-called end face formed by the dimension of thickness t. In other words, even though an explanation is given that the heat dissipation surface S means a region which surrounds the fin 20A by an edge extending along the inside inner peripheral surface 17A and edges rising from the inside inner peripheral surface 17A, it goes without saying that the heat-dissipation effect can be obtained also on the edge face, and it can be said that the edge face contributes to the heat-dissipation effect in terms of increase by the fins 20 in the surface area of the rim inner peripheral surface 17.

In the present embodiment, the dimension of a height H of the fins 20A to 20C was set to be the same. In addition, a width dimension W2 of the fins 20B and the fins 20C was set to be the same, and a width dimension W1 of the fins 20A was set to be shorter than the width dimension W2. The heat dissipation surfaces S dissipate the heat transferred from the rim 3 to the fins 20 mainly to the open air. Each of the fins 20 is provided in such a manner that the heat dissipation surface S is orthogonal to the inner peripheral surface and a long side of the heat dissipation surface S extends along the rim width direction.

In the present embodiment, the fins 20A in the innermost row, the fins 20B in the middle row, and the fins 20C in the outermost row are respectively arranged to be separated by a predetermined distance X along the rim circumferential direction. The fins 20A in the innermost row are separated from the fins 20B in the middle row by a distance Y1 in the rim width direction. The fins 20B in the middle row and the fins 20C in the outermost row are provided in such a manner that ends thereof are overlapped by a length Y2 in the rim width direction.

The fins 20A in the innermost row and the fins 20C in the outermost row are arranged at the same positions in the rim circumferential direction, and the fins 20B in the middle row are arranged to be displaced by a distance V1 in the circumferential direction so as to be located in the middle of the fins 20A (fins 20C) which are arranged adjacent to each other in the rim circumferential direction. Displacement intervals in the circumferential direction of the fins 20A to 20C in each row, the distance Y1 in the width direction and the overlapping length Y2 in each row may be set appropriately.

The fins 20 in the present embodiment are formed by a material different from that of the members (the rim base 10, the bead seat ring 11, the pair of side rings 12; 13 and the lock ring 14) that constitute the rim 3. In other words, the fins 20 are formed as members different from the rim base 10. In the present embodiment, in consideration of heat dissipation, the fins 20 are formed by a copper plate whose thermal conductivity is larger than that of the members constituting the rim 3.

The fins 20 are fixed to the rim base 10 in a non-detachable manner by a fixing means such as a thermally conductive adhesive agent (grease). As in the present embodiment, when the fins 20 are formed as different members, the material of the fins 20 may be the same material as that of the rim 3, preferably a material that has a better thermal conductivity than the that of the materials constituting the rim 3. When the fins 20 are fixed to the rim 3, it may be fixed by an adhesive agent having an excellent thermal conductivity as described above, or by means of different material binding using ultrasonic waves or the like. Preferably, the fins 20 may be attached so as not to contain air in the joint part between the fins 20 and the rim 3. Thereby, it becomes possible to reduce a resistance at the time when the heat is transferred from the rim base 10 to the fins 20, and efficiently transfer the heat from the rim base 10 to the fins 20.

Figure 4A:
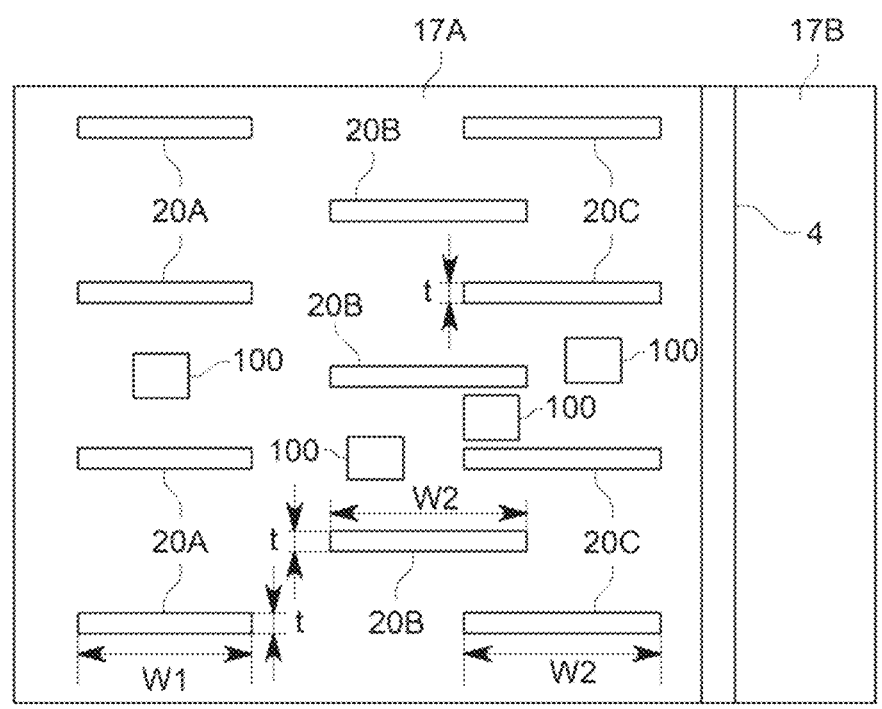
FIGS. 4A and 4B are diagrams illustrating temperature measurement positions of the wheel and experimental results.
Figure 4B:
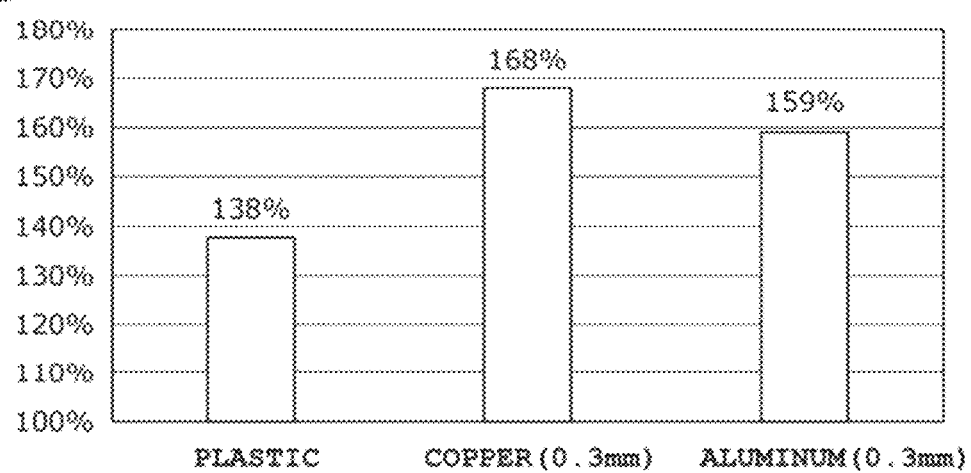

FIGS. 4A and 4B illustrate a model of a preliminary experiment for checking the effect of the fins according to the present embodiment and results of the experiment. As illustrated in FIG. 3, the preliminary experiment was conducted with the use of a model in which the state of the vehicle wheel with fins was developed in a planar shape.

Specifically, in the experimental model, as illustrated in FIG. 4A, the fins were arranged on a flat shape base plate made of steel assuming the material of the rim 3. As the materials for the fins, three types of materials were prepared, which were copper (copper plate) and aluminum (aluminum plate) with thermal conductivities different from that of the material of the rim and plastic with a thermal conductivity lower than that of the material of the rim, and these materials were modeled respectively. The plastic was used to distinguish between the effect of turbulence on the inner circumference surface of the rim 3 and the heat dissipation effect by thermal conduction of the fins 20 according to the present embodiment.

With respect to the size of the fins, sizes of 0.3 mm thick (t), 50 mm high (H), and 100 mm wide (W1) were set for the fins in the innermost row, and 0.3 mm thick (t), 50 mm high (H), and 150 mm wide (W2) were set for the fins in the middle row and in the outermost row. The spacing of the fins in each row was set to the spacing when the fins were arranged in 45 locations at equal intervals in the rim circumferential direction.

As illustrated in FIG. 4A, temperature loggers 100 were attached between the fins 20A and 20A in the innermost row, between the fins 20B and 20B in the middle row, between the overlapped parts between the fins 20B in the middle row and the fins 20C in the outermost row, and between the fins 20C and 20C in the outermost row so as to measure a temperature change in each part. The temperature logger 100 is configured to be able to record a history of temperatures detected by the temperature sensor.

A rate of increase in the thermal conductivity was checked by heating the base plate assuming the heat of the time when the heat generated by the tire was transferred to the rim 3, and by applying airflow toward the fins assuming air flowing inside the wheel 2. The results are illustrated in FIG. 4B.

As illustrated in FIG. 4B, the obtained results show that, by providing the fins according to the present embodiment, the thermal conductivity was improved by 38% for plastic, 59% for aluminum, and 68% for copper, regardless of the materials, compared to a case where the fins were not provided. The plastic fin has a smaller thermal conductivity from the rim compared to that of the aluminum fin and the copper fin. Therefore, an improvement in the thermal conductivity by the plastic fins can be considered to be almost due to the air flowing inside the wheel 2, that is, due to an effect of turbulence. In other words, it can be said that the improvement in the thermal conductivity, from the rim 3, of the aluminum fin and of the copper fin, which have a good thermal conductivity, is a result of addition of the effect of the good thermal conductivity of the aluminum and of the copper to the improvement in the thermal conductivity of the plastic fins. Then, it can be considered that a net increase rate due to differences of the materials is 21% for aluminum and 30% for copper. Therefore, when the fins 20 are provided, by forming the fins 20 with a material that has good thermal conductivity, it is possible to obtain the effect of addition of ease of thermal conduction from the rim 3 to the fins, in addition to the effect of turbulence generated in the air flowing in the wheel 2.

That is, as shown in the present embodiment, by forming the fins and arranging them on the inner circumferential surface side of the rim 3, and due to the increased surface area of the rim 3, heat can be transferred efficiently to the air passing through the inner circumference side of the wheel.

Next, in keeping with the above-described preliminary experiments, as illustrated in FIG. 1, a drum test was conducted by providing fins on an actual wheel 2 and mounting a tire T on the actual wheel 2. For the tire T, a tire for heavy duty vehicles (super large dump truck) that matches the wheel 2 was used. In the drum test, the size and the arrangement of the fins provided in the wheel 2 were the same as in the preliminary experiment described above, and copper was used as the material. The drum test was conducted under a predetermined condition that is applied when a super heavy-duty dump truck runs, for example.

Figure 5:
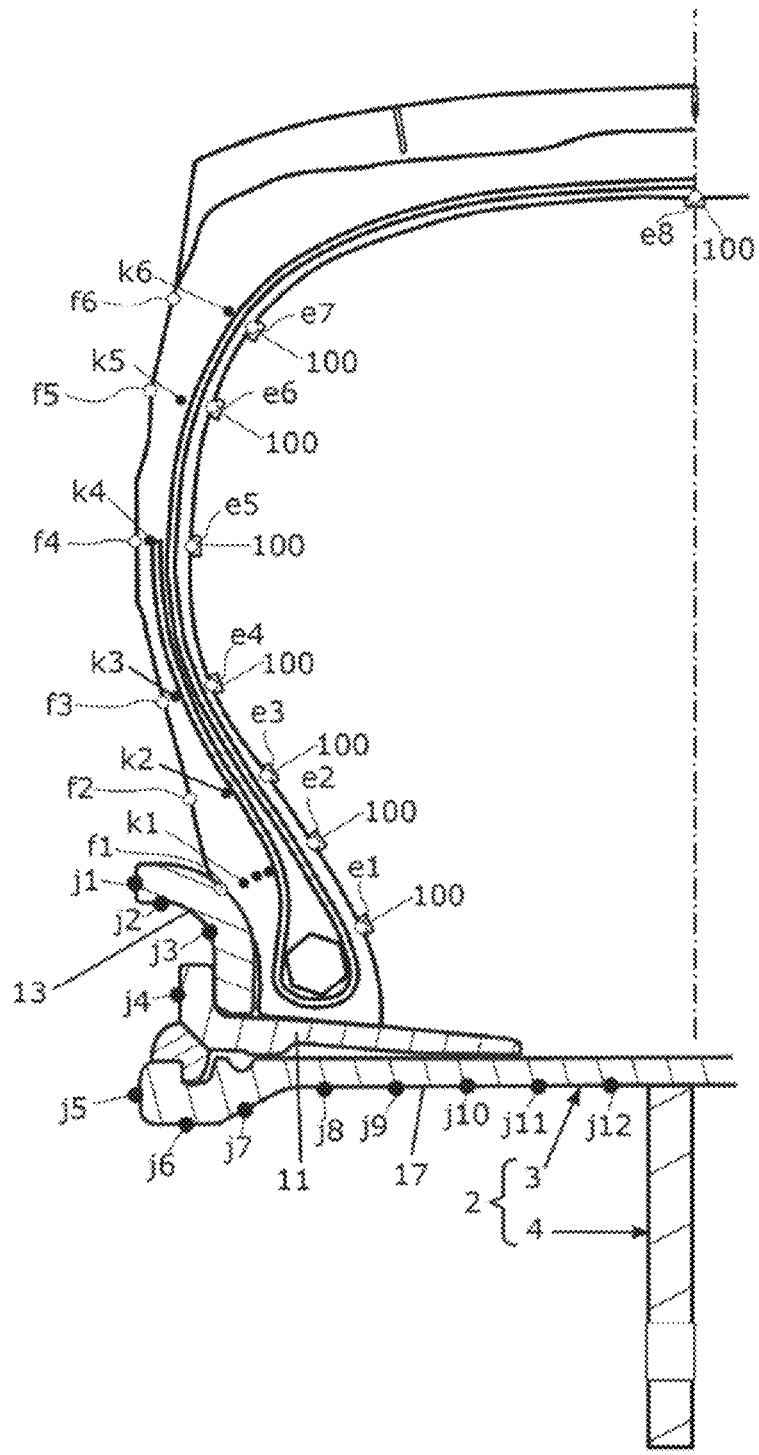
FIG. 5 is a diagram illustrating temperature measurement positions of a tire and the temperature measurement positions of the wheel.

FIG. 5 illustrates measurement points for measuring temperatures of the tire and the wheel in the drum test. In FIG. 5, f1 to f6 indicate temperature measurement positions on the tire surface, k1 to k6 indicate temperature measurement positions on an outside of a ply inside the tire, e1 to e8 indicate temperature measurement positions on an inner liner surface to be measured by the temperature data logger, and j1 to j12 indicate temperature measurement positions on a rim surface. FIGS. 6A to 9C illustrate results thereof.

Figure 8A:
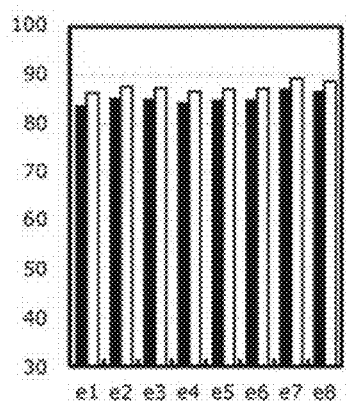
Figure 9A:
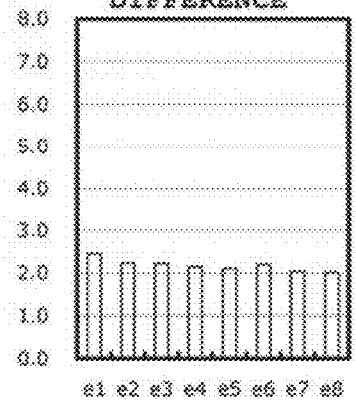
Figure 9A:
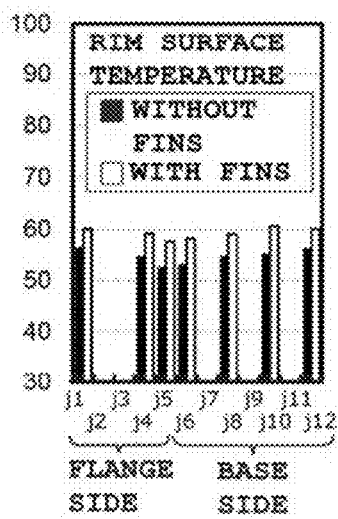
Figure 9C:
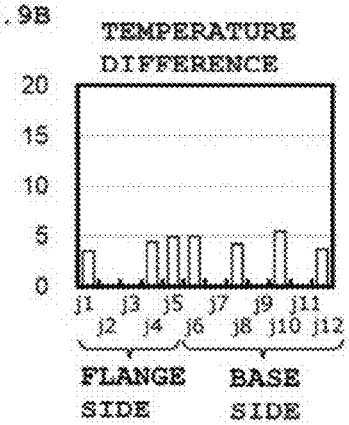
Figure 9C:
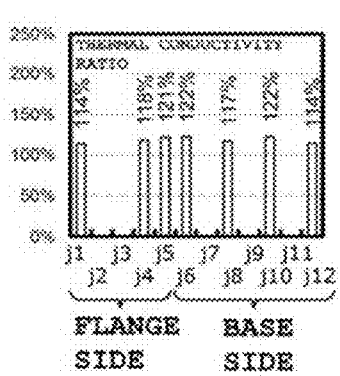

FIGS. 6A and 6B are graphs illustrating measurement results when the temperatures of the tire surface were measured by a thermo camera. FIGS. 7A and 7B are graphs illustrating measurement results when the temperatures of the ply surface were measured by inserting a needle-type thermometer into holes for temperature measurements, which were made in a direction vertical to the ply from the tire surface toward the ply. FIGS. 8A and 8B are graphs illustrating measurement results when the temperatures of the inner liner surface were measured using the temperature data logger. FIGS. 9A to 9C are graphs illustrating measurement results when the temperatures of the rim surface were measured.

As illustrated in each of the graphs in FIGS. 6A to 9C, it was confirmed that the temperatures of the tire and the rim decrease.

The material of the fins 20 is not limited to the above-mentioned copper, but may be any other metal, or non-metal such as resin. Preferably, the fins 20 may be made of a material that has a better thermal conductivity than that of the rim base 10 (rim 3) to which the fins 20 are attached.

Figure 10A:
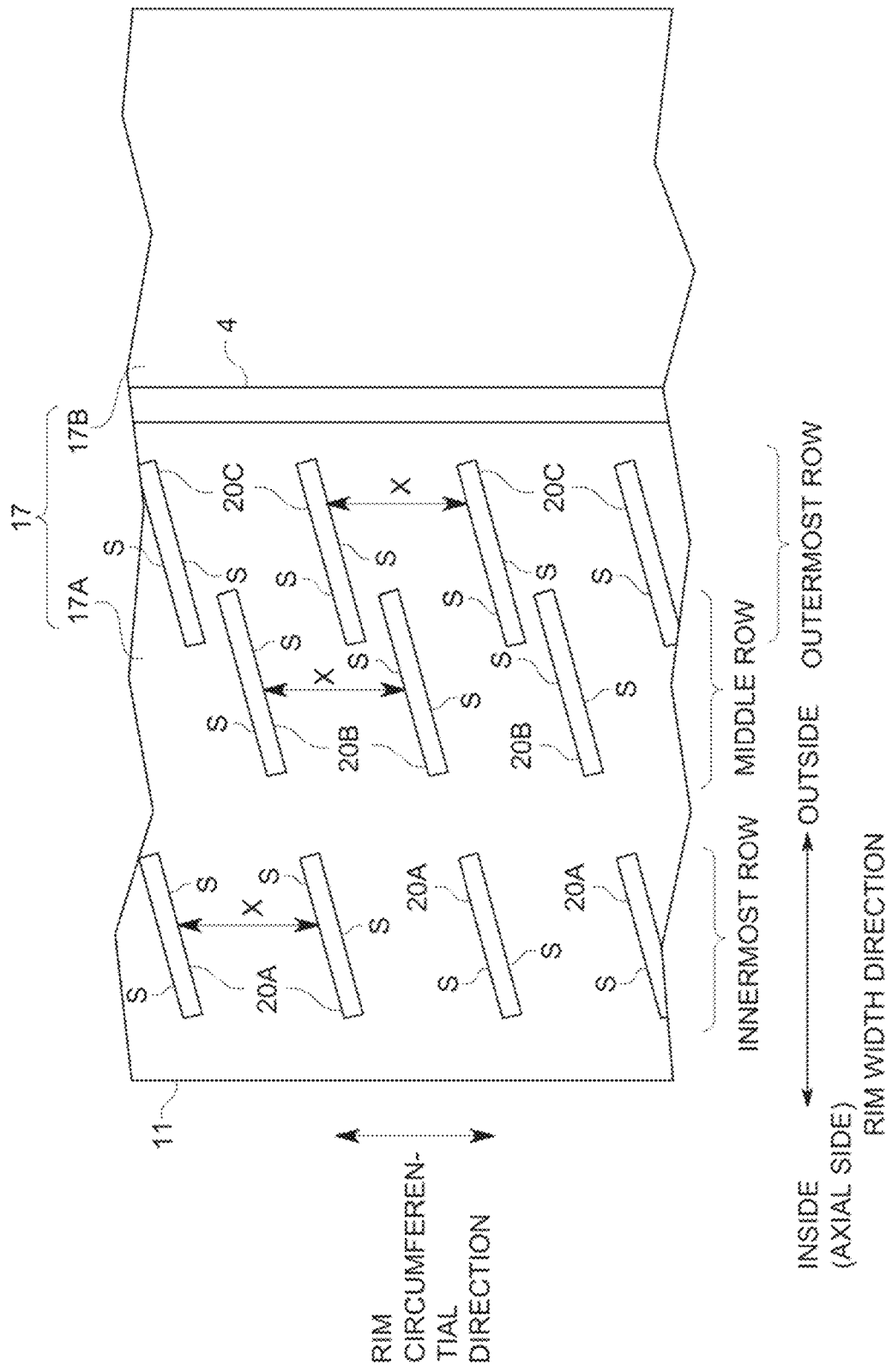
FIGS. 10A and 10B are diagrams illustrating a sectional shape of fins and another sectional shape of the fins.
Figure 10B:
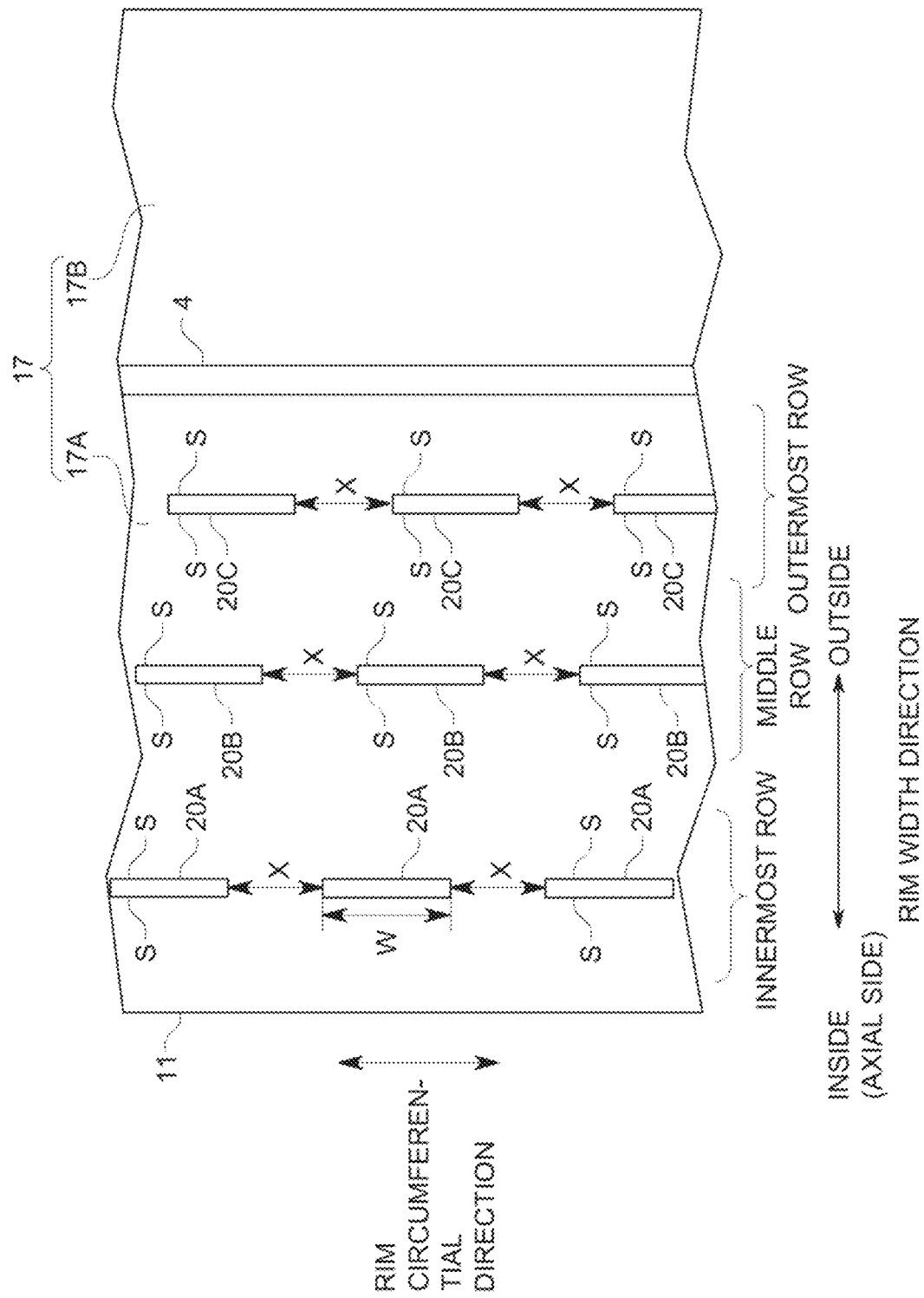
Figure 11A:
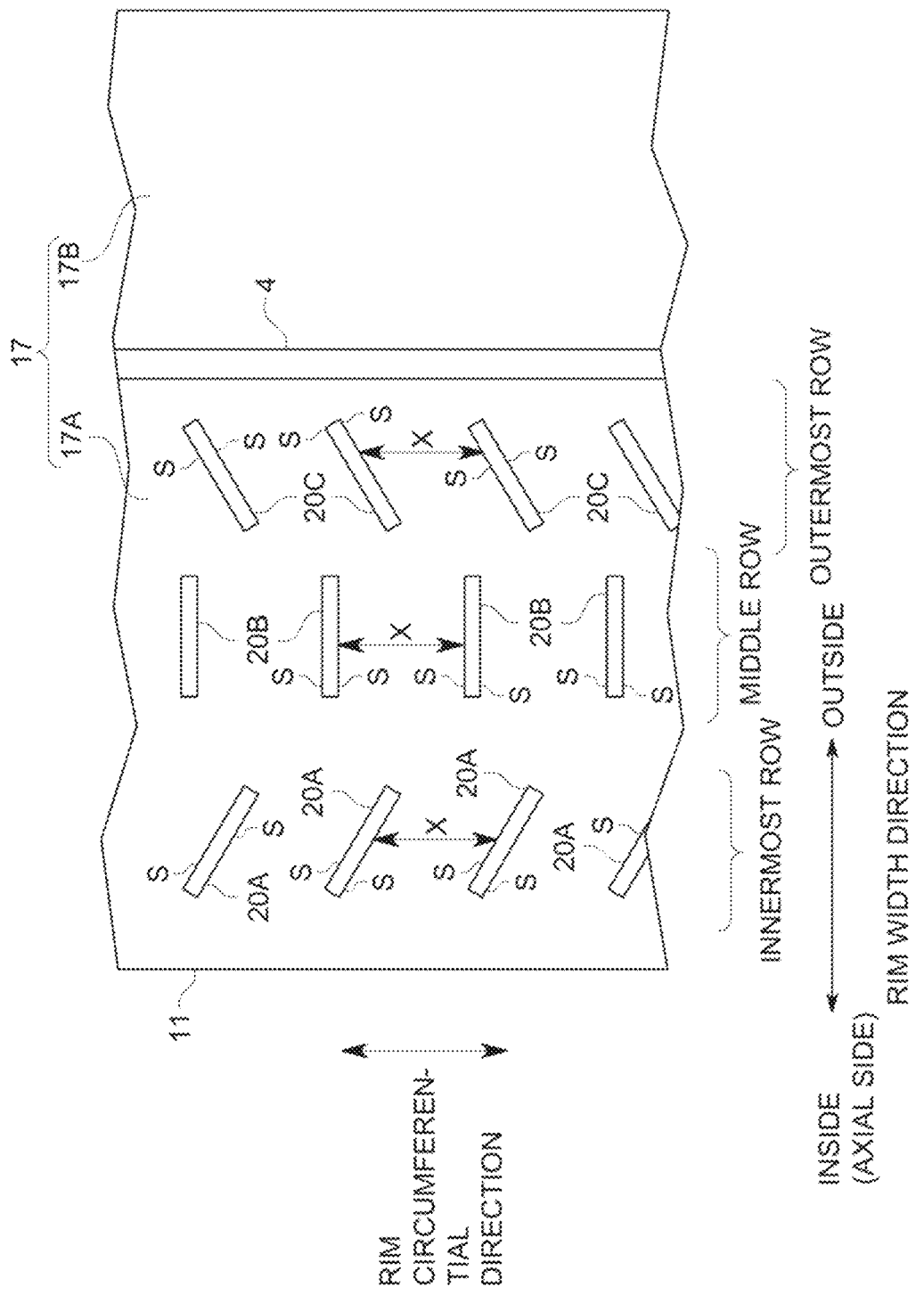
FIGS. 11A and 11B are diagrams illustrating another modes of arrangement of the fins.

FIGS. 10A and 10B and FIGS. 11A and 10B are diagrams illustrating another arrangement patterns of the fins. The above-mentioned arrangement of the fins 20A to 20C is an example, and the fins 20 may be provided as illustrated in FIGS. 10A and 10B and FIGS. 11A and 10B. That is, in the above-mentioned embodiment, as illustrated in FIG. 3, the fins 20 were arranged so that the heat dissipation surfaces S face the rim circumferential direction, however, the arrangement is not limited to this. For example, as illustrated in FIG. 10A, the fins 20 may be provided so that the heat dissipation surfaces S are inclined with respect to the rim circumferential direction. Further, as illustrated in FIG. 10B, the fins 20 may be provided so that the heat dissipation surfaces S face the rim width direction.

Figure 11B:
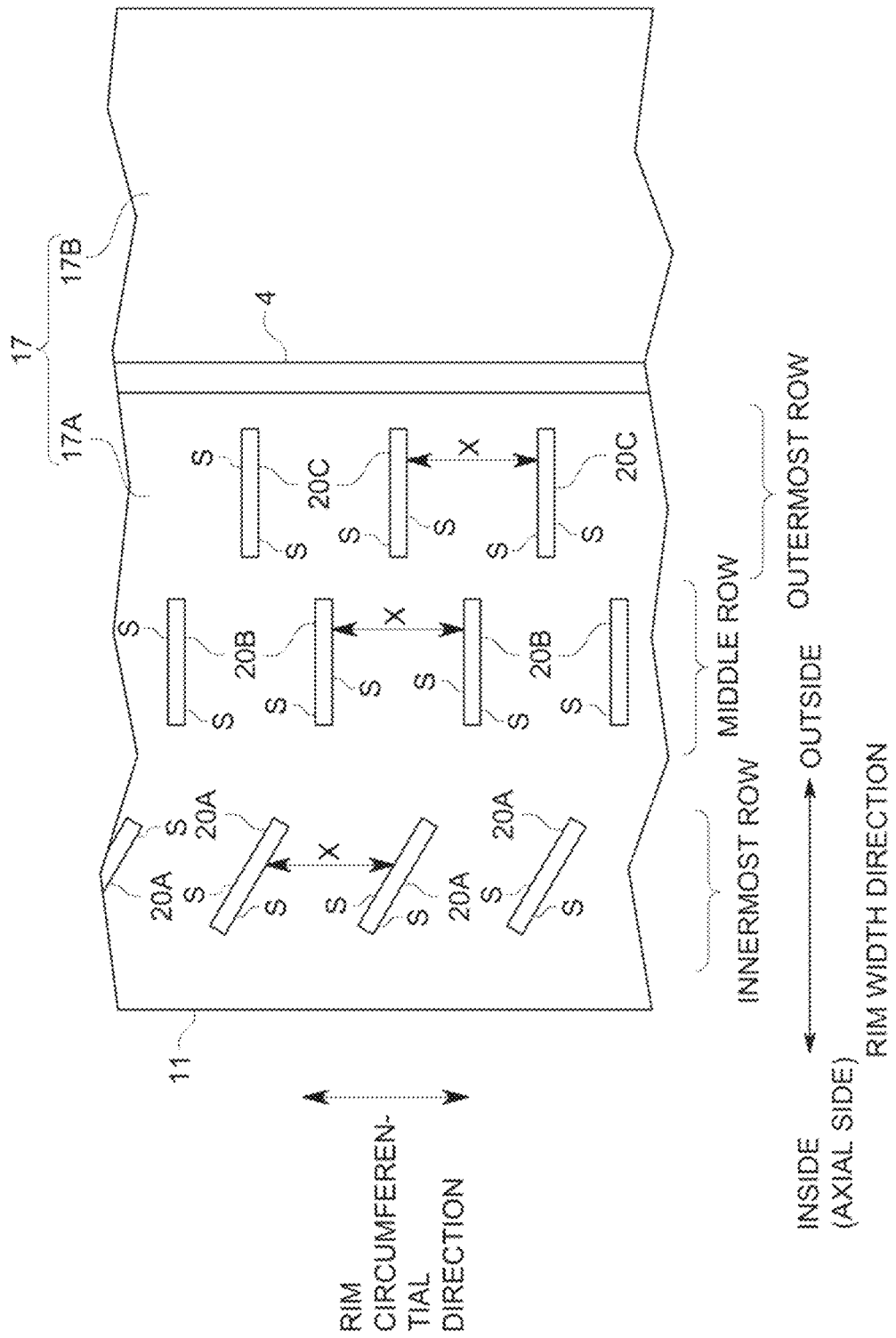

Furthermore, as illustrated in FIG. 3, when the fins 20 are arranged in multiple rows, it is not limited to arrange the fins 20 so that the heat dissipation surfaces S of all the fins 20 face the same direction. For example, as illustrated in FIG. 11A, the outermost row, the middle row and the innermost row may face different directions, and as illustrated in FIG. 11B, the outermost row and the middle row may face the same direction, and only the innermost row may face a different direction.

Figure 12A:
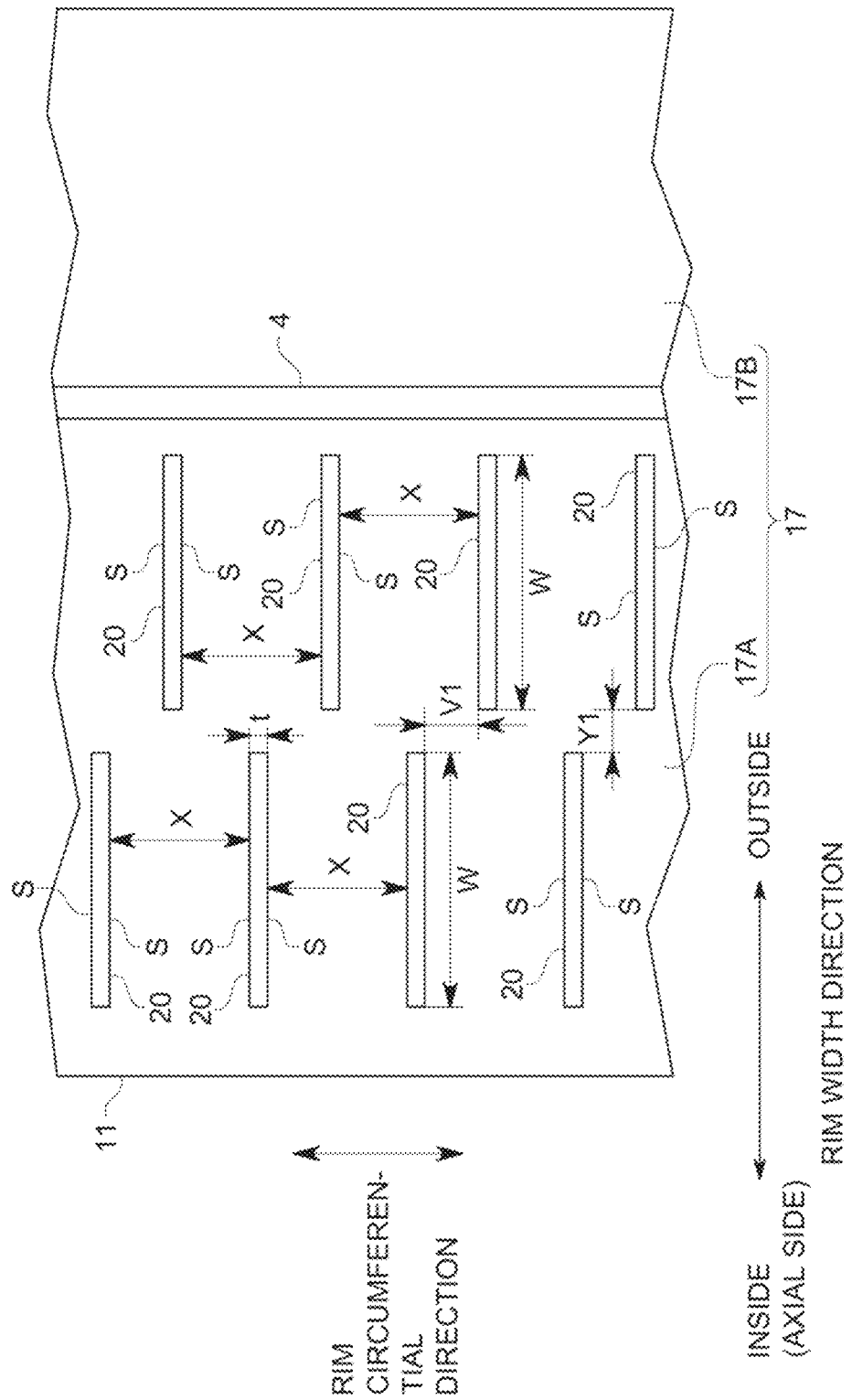
FIGS. 12A and 12B are diagrams illustrating another modes of arrangement of the fins.
Figure 12B:
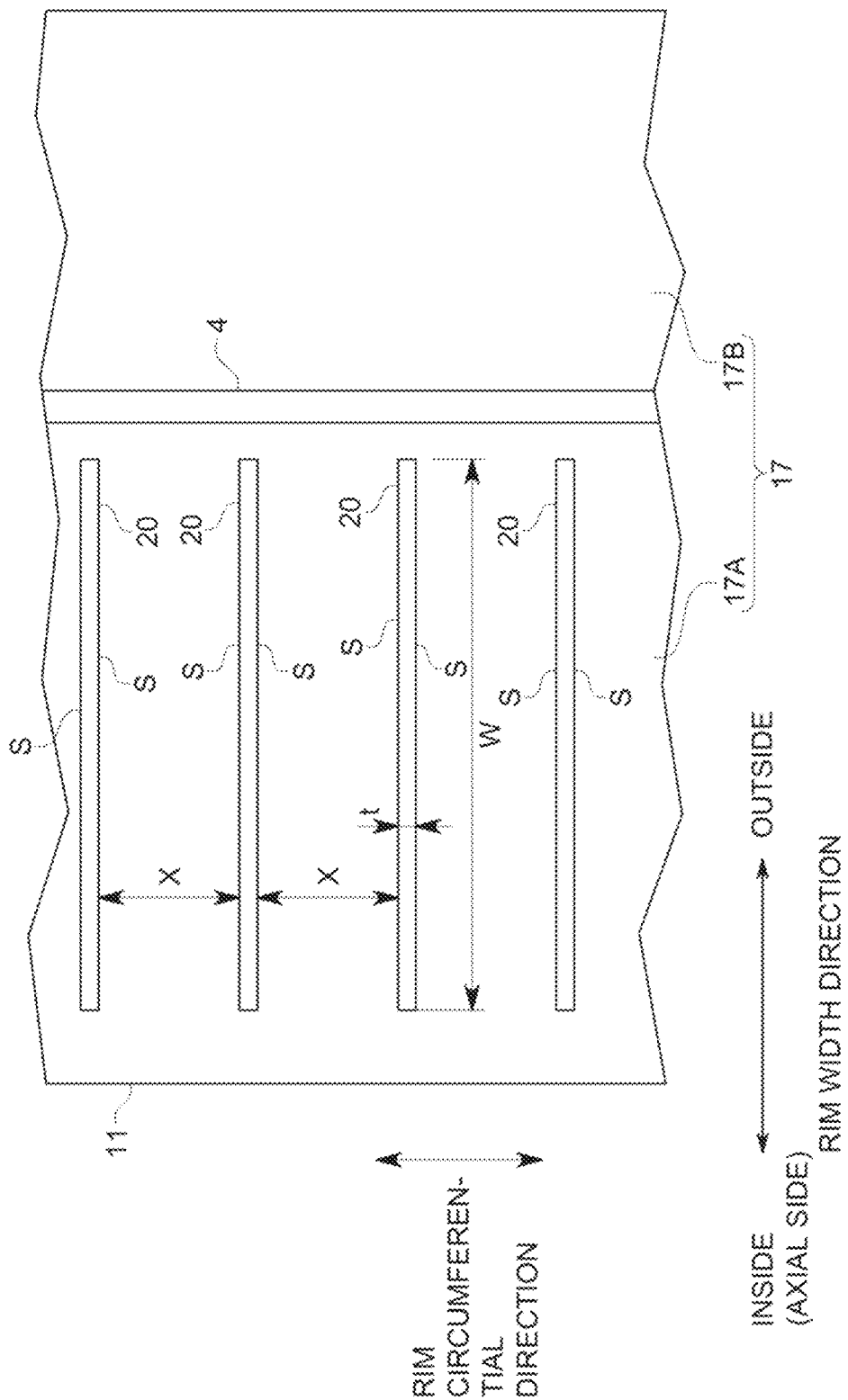

FIGS. 12A and 12B are diagrams illustrating another arrangement patterns of the fins. In the above-mentioned embodiment, the fins 20 were described as being provided in three rows in the tire width direction, however, the arrangement is not limited to this. For example, as illustrated in FIG. 12A, the fins 20 may be arranged in two rows, or as illustrated in FIG. 12B, the fins 20 may be arranged in one row.

The fins 20A to 20C described above may be arranged, for example, in such a manner that the number of fins per unit area of the inside inner peripheral surface 17A becomes constant. "The number of fins per unit area of the inside inner peripheral surface 17A becomes constant" means, that, for example in FIG. 3, by setting a range surrounded by a square frame of a predetermined size, considering this square frame as the unit area, and when moving the position of the square frame arbitrarily within the range of the inner peripheral surface 17A, the number of the fins included in the square frame becomes constant.

Figures 13A, 13B, 13C:
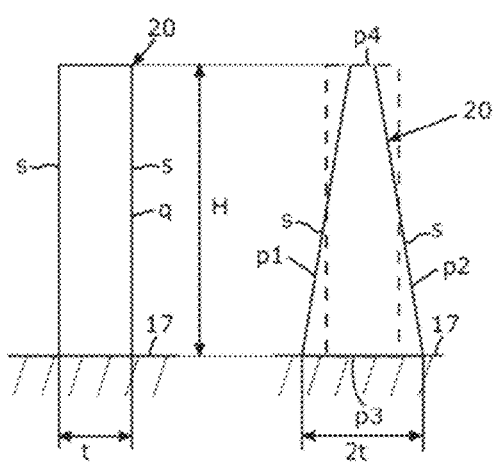
FIGS. 13A to 13C are diagrams illustrating another modes of arrangement of the fins.

FIGS. 13A to 13C are diagrams illustrating a cross-sectional shape and another cross-sectional shapes of the fins 20. The fins 20 (20A-20C) described above have a rectangular cross-sectional shape, as illustrated in FIG. 13A, however, it is not limited to the rectangular cross-sectional shape. The cross-sectional shape here refers to a shape cut by a plane orthogonal to the longitudinal direction of the fins 20. For example, as illustrated in FIG. 13B, it may be a trapezoidal shape, or as illustrated in FIG. 13C, it may be a triangle shape. By making the cross-sectional shape to be trapezoidal or triangular, the area of the heat dissipation surfaces S of the fins 20 can be increased.

Specifically, if the width and the height of the fins are the same, oblique sides p1; p2 of the trapezoidal shape forming the heat dissipation surface S become longer than a side q which is a height H of the rectangular shape. Therefore, if the width of the fins 20 is the same, the area of the heat dissipation surface S becomes wider in the trapezoidal shape, thus the heat-dissipation efficiency can be improved. Preferably, the cross-sectional shape of the trapezoidal shape may be set so that the cross-sectional area of the rectangular-shape is maintained. For example, by setting the length 2t of a side p3, which is the bottom of the trapezoidal shape, to be twice of the thickness t and a length of a side p4, which is the top of the trapezoidal shape, to be ½ of the thickness t, the area of the heat dissipation surfaces S of the fins 20 can be increased without changing the weight or the height H of the fins 20.

Incidentally, the cross-sectional shape may be set appropriately, and is not limited to rectangular, trapezoidal or triangular shapes or the like.

In the above-mentioned embodiment, the explanation has been made that the fins 20 was provided as the member different from the rim 3. However, it is not limited thereto. That is, the fins 20 may be integrally formed with the rim base 10 (rim 3). By forming the fins 20 integrally with the rim base 10, the boundary part of the materials between the rim base 10 and the fins 20 is eliminated, hence the heat generated in the tire T can be smoothly conducted from the rim base 10 to the fins 20. By arranging the fins 20 on the rim 3 in this way, the heat-dissipation balance of the heat transferred from the rim base 10 to the fins 20 can be made uniform.

In the above-mentioned embodiment, the height H of the fins 20 was set to be the same, but it is not limited to this and may be changed appropriately. For example, when multiple rows of fins are arranged as illustrated in FIG. 3, the height of the fins in each row may be made different so that a distance from the rotational center of the rim 3 becomes constant.

Incidentally, the size of the fins 20 is not limited to the dimensions used in the drum test mentioned above. Taking into account that the surface area of the inner circumference surface of the tire is to be increased by the fins 20, the height H of the fins 20 may be at least higher than 5 mm that does not interfere with the vehicle body. More preferably, it may be 20 mm or less and 100 mm or more. Further, the thickness t of the fins 20 may be set within the range of 1 mm or more to 15 mm or less, taking the strength and so on of the material into consideration.

As shown in the above-mentioned embodiment, when the heat dissipation surfaces S of the fins 20 are arranged toward the rim circumferential direction, by arranging the fins 20 at intervals of 20 mm or more as the distance X between the fins 20, for example, it is possible to efficiently dissipate the heat generated by the tire T by applying outside air to the rim inner circumferential surface 17 and the surface of the fins 20.

As illustrated in FIG. 10B, when the heat dissipation surfaces S of the fins 20 are arranged toward the rim width direction, the fins may be arranged so that the distance between the fins lined up in the rim width direction becomes, for example, 10 mm or more.

The higher the height H of the fins 20 becomes, the larger the area of the heat dissipation surfaces S can be, however, even if the height H of the fins is increased, the heat is dissipated before reaching the tip of the fins, thus it is brought into a state in which the tip side of the fins is not substantially functioning. Further, the height H of the fins 20 is restricted with respect to the axle member 7. For example, a member on the vehicle body side collides with the fins 20 and the like. In such a case, the height H may be lowered and the width dimensions W (W1, W2) may be lengthened.

The height H and widths W (W1; W2) of the above-mentioned fins 20 may be set in accordance with the area of each heat dissipation surface S. Further, the area of the heat dissipation surface S of each of the fins 20 may be set, for example, in accordance with the area of the rim inner peripheral surface 17 or the area of the inside inner peripheral surface 17A.

The area of the heat dissipation surface S of each of the plurality of fins 20 may be set such that, for example, a sum of the areas of the heat dissipation surfaces S of all the fins 20 is 70% or more, more preferably 100% or more, of the area of the rim inner peripheral surface 17 on which the fins 20 are provided.

Figure 14A:
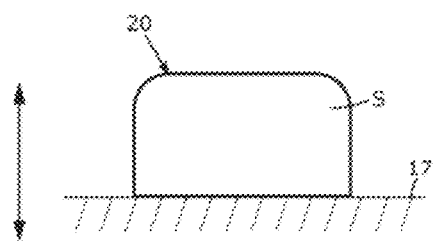
FIGS. 14A to 14D are diagrams illustrating another forms of shape of heat dissipation surface of the fin.
Figure 14B:
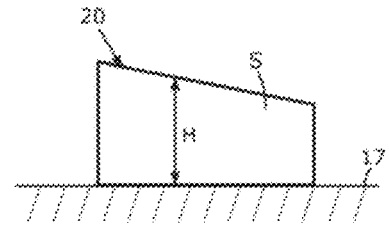
Figure 14C:
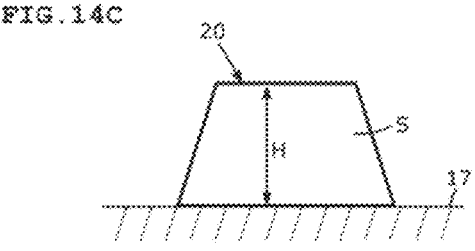
Figure 14D:
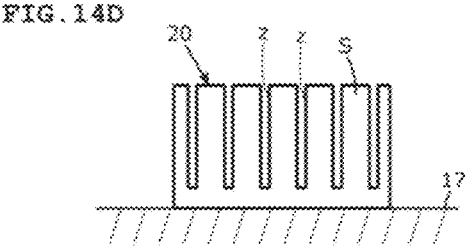

FIGS. 14A to 14D are diagrams illustrating another patterns of the shape of the heat dissipation surfaces S of the fins 20. In the above-described embodiment, the shape of the heat dissipation surface S was rectangular, but it is not limited to this, and the shape may be set appropriately. For example, as illustrated in FIG. 14A, corners may be rounded, as illustrated in FIG. 14B, it may be a trapezoidal shape whose height from the rim inner peripheral surface 17 does not change, as illustrated in FIG. 14C, it may be a trapezoidal shape whose height from the rim inner peripheral surface 17 changes, or as illustrated in FIG. 14D, slits z extending in the rim radial direction may be formed on the fins 20.

Figure 15:
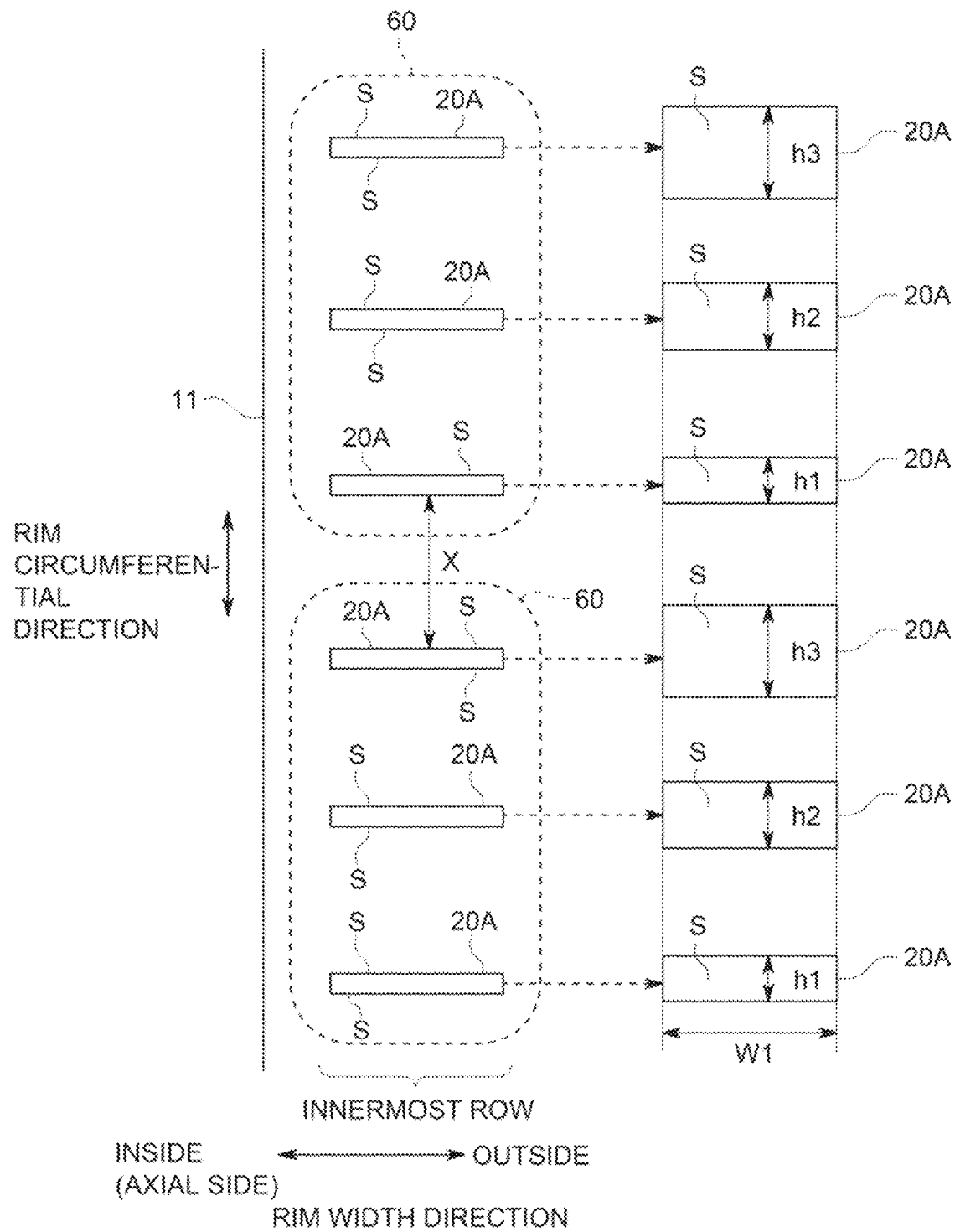
FIG. 15 is a diagram illustrating another mode of arrangement of the fins.

FIG. 15 is a diagram illustrating another pattern of the fin arrangement. In the above-described embodiment, it has been explained that the shapes of the fins 20A to 20C arranged in the rim circumferential direction are the same, but it is not limited thereto, and the shapes may be differentiated by a predetermined pattern for each row arranged in the rim circumferential direction. For example, to exemplify using the fins 20A in the innermost row illustrated in FIG. 3, the height H of the rectangularly formed fins 20A may be set to change periodically in the rim circumferential direction, such as the height h1→h2→h3→h1→h2→h3. In other words, a group 60 of fins 20A whose height changes in the order of the height h1, h2, and h3 may be periodically arranged on the rim inner circumferential surface along the rim circumferential direction.

The fins may be formed in the same manner also in the rim width direction. That is, a group of fins 20 lined up in the rim width direction may be formed with different shapes, and these fins may be arranged periodically in the rim circumferential direction.

In the above-described embodiment, the explanation has been made that the fins 20 were provided on the inside inner peripheral surface f the rim inner peripheral surface 17, but the fins 20 may be provided on the outside inner peripheral surface 17B.

As described above, by providing fins on the rim of the wheel to increase the surface area of the rim inner circumferential surface, active cooling can be achieved and the heat generated in the tire can be efficiently dissipated.

In the above-described embodiment, the explanation has been made using the wheel 2 for a super-large dump truck, but it is not limited to this and a wheel for other vehicles may be used. Tires in trucks, buses, construction vehicles and the like are particularly suitable for wheels used in such vehicles because the continuous operating time is long, the load on the tires is large, and the heat generated by the tire is high.

In summary, the present invention can be described as follows. Namely, an aspect of the present invention is a vehicle wheel including a rim part on which a tire is mounted and a vehicle body attachment part which is attached to a vehicle body, in which the rim part has, on an inner circumferential surface thereof, a plurality of fins each having a heat dissipation surface, and in which the fins are arranged periodically along a circumferential direction.

According to this configuration, since the heat generated in the tire is dissipated from the fins via the rim, it is possible to suppress a temperature rise of the tire.

As another configuration of the vehicle wheel, the plurality of fins may have a constant height from the inner circumferential surface, or the heat dissipation surfaces may have a constant area. Further, the number of fins per unit of the inner peripheral surface may be constant, or a sum of areas of the heat dissipation surfaces may be 70% or more of an area of the inner peripheral surface.

Furthermore, as a configuration of a tire-wheel assembly, the assembly may include the vehicle wheel described above to which a tire has been assembled.

The invention claimed is:

1. A vehicle wheel comprising a rim part on which a tire is mounted and a vehicle body attachment part which is attached to a vehicle body,
   wherein the rim part has, on an inner circumferential surface thereof, a plurality of fins each having a heat dissipation surface,
   wherein the fins are arranged periodically along a circumferential direction,
   wherein the plurality of fins comprise an innermost row of fins, a middle row of fins, and an outermost row of fins;
   wherein fins in the innermost row are separated from fins in the middle row in a rim width direction; and
   wherein the fins in the middle row and fins in the outermost row are overlapped in the rim width direction.

2. The vehicle wheel according to claim 1, wherein the plurality of fins have a constant height from the inner peripheral surface.

3. The vehicle wheel according to claim 1, wherein the heat dissipation surfaces of the plurality of fins have a constant area.

4. The vehicle wheel according to claim 1, wherein the number of fins per unit of an area of the inner peripheral surface is constant.

5. The vehicle wheel according to claim 1, wherein, a sum of areas of the heat dissipation surfaces of the plurality of fins is 70% or more with respect to an area of the inner peripheral surface.

6. A tire-wheel assembly comprising the vehicle wheel according to claim 1 to which a tire has been assembled.

7. The vehicle wheel according to claim 1, wherein the fins extend in a direction that is perpendicular to the circumferential direction.

8. The vehicle wheel according to claim 1, wherein the fins in the innermost row are 50 mm high and 100 mm wide, the fins in the middle row and in the outermost row are 50 mm high and 150 mm wide, and a vehicle on which the wheel is provided is a construction vehicle.

* * * * *